United States Patent
Reitz de Swardt et al.

(10) Patent No.: US 9,868,398 B2
(45) Date of Patent: Jan. 16, 2018

(54) SOCKET JOINT WITH INTEGRATED TUBE ANCHORS

(71) Applicant: MEKRA LANG GMBH & CO. KG, Ergersheim (DE)

(72) Inventors: Rolf Reitz de Swardt, Blythewood, SC (US); Alexandre Petroff, Columbia, SC (US); Andreas Enz, Burgbernheim (DE); Matthias Zink, Ohrenbach (DE); Orhan Kilic, Ansbach (DE); Werner Lang, Ergersheim (DE)

(73) Assignee: Mekra Lang GmbH & Co. KG, Ergersheim (DE)

( * ) Notice: Subject to any disclaimer, the term of this patent is extended or adjusted under 35 U.S.C. 154(b) by 0 days.

(21) Appl. No.: 14/914,718

(22) PCT Filed: Jul. 30, 2014

(86) PCT No.: PCT/EP2014/066416
§ 371 (c)(1),
(2) Date: Feb. 26, 2016

(87) PCT Pub. No.: WO2015/028241
PCT Pub. Date: Mar. 5, 2015

(65) Prior Publication Data
US 2016/0207463 A1     Jul. 21, 2016

Related U.S. Application Data
(60) Provisional application No. 61/871,988, filed on Aug. 30, 2013.

(51) Int. Cl.
*B60R 1/06*     (2006.01)
*F16C 11/06*     (2006.01)
(Continued)

(52) U.S. Cl.
CPC .............. *B60R 1/0605* (2013.01); *B60R 1/00* (2013.01); *B60R 1/06* (2013.01); *B60R 11/04* (2013.01);
(Continued)

(58) Field of Classification Search
CPC .............................. B60R 1/0605; F16C 11/06
(Continued)

(56) References Cited

U.S. PATENT DOCUMENTS

| 1,537,039 | A | * | 5/1925 | Short | B60R 1/04 |
| | | | | | 16/DIG. 4 |
| 2,604,818 | A | * | 7/1952 | Morgenstern | B60R 1/06 |
| | | | | | 248/483 |

(Continued)

FOREIGN PATENT DOCUMENTS

| CN | 1520493 A | 8/2004 |
| DE | 43 43 691 | 6/1995 |

(Continued)

OTHER PUBLICATIONS

Mekra Lang Gmbh & Co. KG; International Patent Application No. PCT/EP2014/066416; International Search Report; dated Mar. 5, 2015; 4 pages.

*Primary Examiner* — Ricky D Shafer
(74) *Attorney, Agent, or Firm* — Dority & Manning, P.A.

(57) ABSTRACT

A socket joint for carrying a mirror head or indirect vision system on a support tube to be mounted to a vehicle and a mirror or indirect vision arrangement comprising such socket joint and a mirror head or indirect vision system is provided. The socket joint comprises a support tube with at least one opening to be attached to a vehicle, a joint base contacting the support tube, at least one anchor extending through said at least one opening in said support tube, and at least one fastener engaging the at least one anchor and (Continued)

extending through a fastening hole in the joint base into the anchor. By the engagement of the fastener in or with the anchor, the portion of the anchor located within the support tube engages an interior surface of said support tube and said support tube is clamped between anchor and joint base.

17 Claims, 7 Drawing Sheets

(51) Int. Cl.
  *F16M 13/02* (2006.01)
  *B60R 1/00* (2006.01)
  *B60R 11/04* (2006.01)
(52) U.S. Cl.
  CPC ............ *F16C 11/06* (2013.01); *F16M 13/02* (2013.01); *Y10T 403/32196* (2015.01)
(58) Field of Classification Search
  USPC .................. 359/874, 881; 248/479, 481, 483
  See application file for complete search history.

(56) References Cited

U.S. PATENT DOCUMENTS

| | | | | |
|---|---|---|---|---|
| 2,878,047 | A * | 3/1959 | Booth | F16C 11/06 |
| | | | | 280/124.108 |
| 2,929,600 | A * | 3/1960 | Malachowski | B60R 1/06 |
| | | | | 248/481 |
| 4,981,279 | A * | 1/1991 | Andreas | B60R 1/066 |
| | | | | 248/478 |
| 4,988,178 | A * | 1/1991 | Eifert | B60R 1/0605 |
| | | | | 248/231.31 |
| 5,110,196 | A | 5/1992 | Lang et al. | |
| 5,583,703 | A | 12/1996 | Lang et al. | |
| 5,604,644 | A | 2/1997 | Lang et al. | |
| 5,687,035 | A * | 11/1997 | Lang | B60R 1/0612 |
| | | | | 359/864 |
| 5,889,627 | A * | 3/1999 | Englander | B60R 1/0605 |
| | | | | 359/864 |
| 6,382,804 | B1 | 5/2002 | Lang et al. | |
| 6,491,402 | B1 * | 12/2002 | Stenzel | B60R 1/0605 |
| | | | | 248/475.1 |
| 6,793,357 | B2 * | 9/2004 | Stenzel | B60R 1/0612 |
| | | | | 359/871 |
| 7,448,765 | B2 * | 11/2008 | Lang | B60R 1/0605 |
| | | | | 359/879 |
| 2007/0053087 | A1 | 3/2007 | Courbon et al. | |
| 2008/0073477 | A1 | 3/2008 | Lang et al. | |

FOREIGN PATENT DOCUMENTS

| | | |
|---|---|---|
| EP | 0 342 412 | 11/1989 |
| EP | 0 654 377 | 5/1995 |
| EP | 1 216 883 | 6/2002 |
| EP | 1 346 161 | 9/2003 |
| GB | 877 760 | 9/1961 |

* cited by examiner

SOCKET JOINT WITH INTEGRATED TUBE ANCHORS

The present invention concerns a socket joint for carrying a mirror head or indirect vision system on a support tube to be mounted to a vehicle and a mirror or indirect vision arrangement comprising such socket joint and a mirror head or indirect vision system.

Exterior mirror assemblies or indirect vision systems (e.g. cameras) for commercial vehicles are relatively large, since, as a rule, several mirror elements and/or mirror heads combined with several mirror elements or several camera segments may be present. For this reason, mirror heads or indirect vision systems are often fastened onto a support member, e.g. steel tubing mounted to the vehicle exterior. The fastening of the mirror heads or indirect vision systems onto the support tube is typically done by means of clamp fittings with a first and a second clamping part, which cooperate to enclose the support tube. EP1216883B1 shows an example for such a clamp mechanism. Because clamp connections grip the support tube from both sides, conventional clamping parts are often bulky in order to firmly attach mirror head or indirect vision system to the support tube. This bulky shape of the clamping assembly can cause aerodynamic turbulence around the mirror head or indirect vision system and can lead to various unwanted results, such as poor fuel economy and undesired vibration of the mirror head or indirect vision system. Excessive vibration can impose increased mechanical stress onto the support and mounting components, thereby reducing the durability of the clamping assembly, mirror assembly or indirect vision system.

Previous attempts to avoid these issues with a clamp type arrangement included providing an aerodynamically streamlined covering over the clamping components to attempt to avoid unpleasant turbulence at driving air speed and to prevent excessive vibration. This streamlined covering was fully incorporated in the clamping assembly.

This type of clamp connection assembly, however, leads to increased manufacturing costs due to increased assembly complexity. Furthermore, additional problems due to the rather complicated procedure for properly aligning such clamp type connections and positioning the mirror head assembly or indirect vision system on the support tube reduce the commercial applicability of such clamping connections. Also, the increased number of parts constituting the connection between the support tube and the mirror head or indirect vision system leads to an undesirable increase in the weight of the connection assembly. As an additional disadvantage, these conventional clamp connections tend not to provide an aesthetically appealing and streamlined outer appearance.

Accordingly, it is the object of the present invention to provide an improved connection joint or socket joint for mounting a mirror head or indirect vision system to a support tube attached to a vehicle, wherein that connection joint provides reduced manufacturing costs and reduced assembly complexity. Furthermore it is object of the present invention to provide a mirror or indirect vision arrangement with such a socket joint.

This object is achieved by a socket joint and by a mirror or indirect vision arrangement.

The socket joint for carrying a mirror head or an indirect vision system according to the present invention comprises a support tube to be attached to a vehicle and comprising at least one opening, a joint base contacting the support tube, at least one anchor extending through said at least one opening in said support tube, and at least one fastener engaging the at least one anchor and extending through a fastening hole in the joint base into the anchor. By the engagement of the fastener in or with the anchor, the portion of the anchor located within the support tube engages an interior surface of said support tube and said support tube is clamped between anchor and joint base. For carrying a mirror head or an indirect vision system, the socket joint is furthermore provided with a carrier structure providing the connection between joint base and the mirror head or an indirect vision system. By the engagement of the fastener in or with the anchor the portion of the anchor located within the support tube may additionally expand radial outwardly to increase to contact area between anchor and support tube.

Since the connection between support tube and joint base is achieved within the support tube and no clamps around the support tube are necessary the whole construction is less bulky and of reduced weight.

According to a preferred embodiment a fixing opening is provided adjacent to the anchor opening. The anchor comprises a mounting slit allowing alignment of the fixing opening with the fastening hole by movement parallel to the longitudinal axis of the support tube of the joint base with anchor after insertion the anchor into the anchor opening. This provides increased stability since the joint base is already hold on the support tube although the fastener is not yet engaged in the anchor. After engagement of the fastener in the anchor the joint base and thus the mirror head or indirect vision system is securely mounted to the support tube.

When the fixing opening and the anchor opening are separate openings the axial movement of the joint base with respect to the support tube is prevented by form-locking. However, it is also possible that the anchor opening and the fixing opening are a single opening with different widths. Then movement of the joint base with respect to the support tube is prevented by friction-locking.

In an embodiment of the invention the back side of the joint base is concave to match the convex structure of the support tube, thereby preventing twisting of the joint base with mirror head or indirect vision system with respect to the support tube.

In a further embodiment the front side of the joint base has a concave portion complementary to a convex portion on a carrier structure for the mirror head or the indirect vision system. This structure allows for angular movement of the mirror head or indirect vision system with respect to the support tube. Such a structure is known from EP1346161B1.

In another embodiment connecting means for connecting the joint base with the carrier structure comprises a central connecting shaft for mounting the mirror head or the indirect vision system. This shaft is preferably hollow and extends outward from said second concave portion on said joint base.

In a further embodiment a spring loaded connecting bolt extends through the hollow shaft and is secured in the joint base, thereby pressing said carrier structure to said joint base. Such a structure is likewise known from EP1346161B1.

In an embodiment of the present invention, the socket joint comprises a single anchor that is essentially aligned with the spring loaded connecting bolt and wherein the spring loaded connecting bolt simultaneously is fastener extending through said fastening hole from the front side of the joint base into said anchor to form said doweled joint. Thus the with single spring loaded connecting bolt the mirror or indirect vision system is mounted to the joint base and joint base is mounted to the support tube. As consequence the socket joint has fewer components and is easier to assemble.

In another embodiment, a single anchor is arranged at a distance along the support tube away from the central connecting shaft and protrudes essentially orthogonally to the longitudinal axis of said support tube.

In a further embodiment the carrier structure is a conventional adjusting unit for angular movement of the mirror head or the indirect vision system. The adjusting unit is preferable mounted to the joint base by screws.

For enhanced stability of the connection between the first concave portion and the support tube of the socket joint, in another embodiment the socket joint comprises a plurality of anchors located on the back side of the joint base and each extending through corresponding anchor openings in said support tube. The plurality of anchors with an associated plurality of fasteners engaging the anchors enhances stability.

a specific case of the above embodiment, the plurality of anchors are arranged in a straight line. This straight line may be arranged to run parallel to the longitudinal axis of the support tube.

In an embodiment of the present invention, the fastener is engaged in the anchor in a form-locking or friction-locking mechanism.

In a further embodiment of the present invention, the at least one anchor is integrally molded to the back side of the joint base. This serves to improve the stability and durability of the connection between joint base and the support tube of the socket joint.

Further advantages and features of the present invention will become more apparent from the specification in conjunction with the drawings, wherein FIG. 1 shows a cross sectional view along the longitudinal axis of a support tube of a first embodiment of a socket joint with only one anchor that is essentially aligned with the central connecting bolt;

Figure 1:
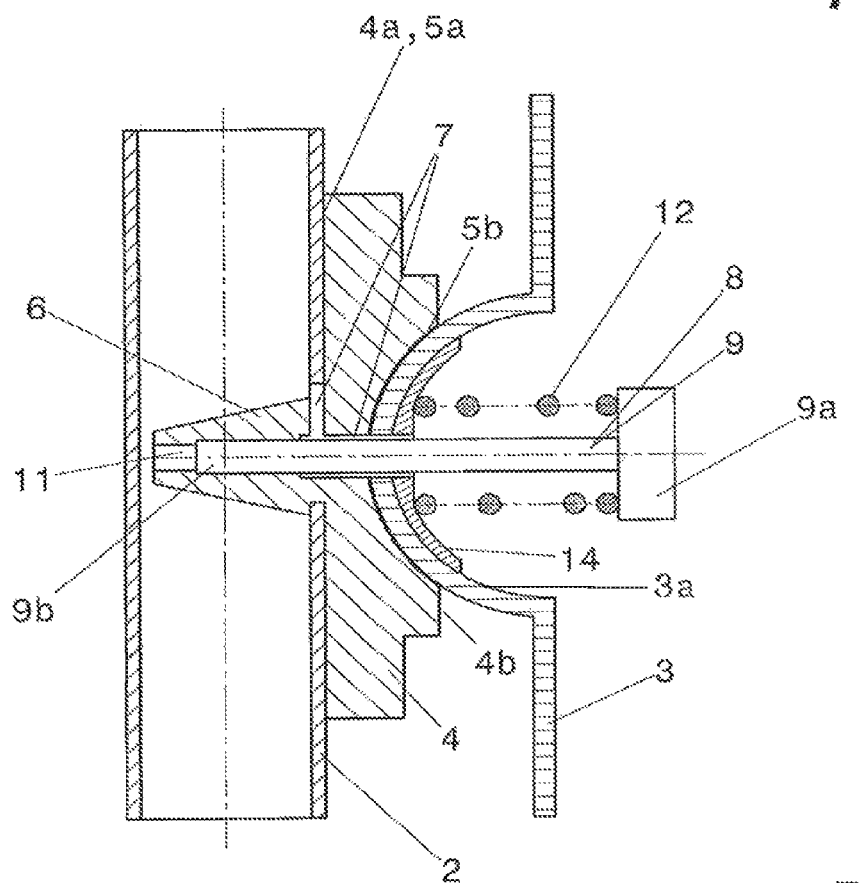
Figure 2:
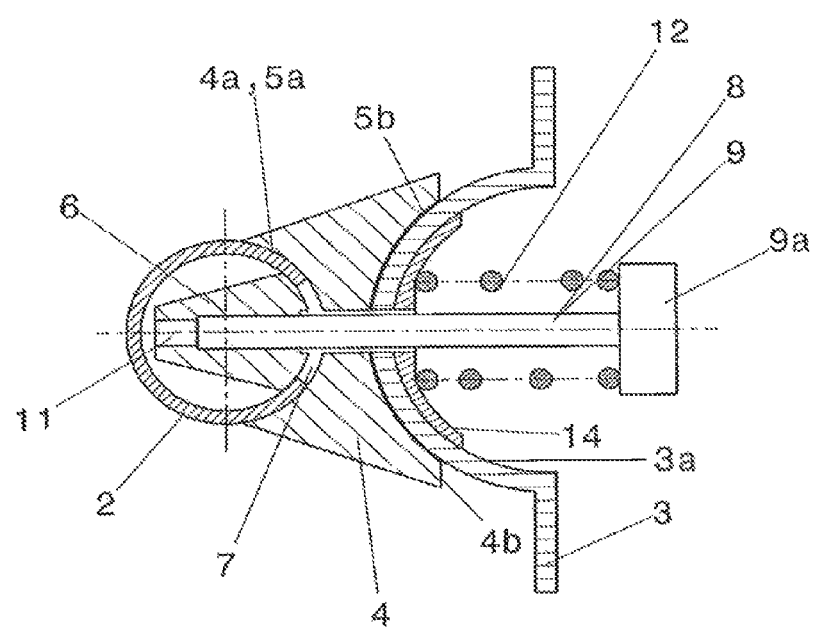
FIG. 2 shows a cross sectional view along an axis that is orthogonal to the longitudinal axis of the support tube of the socket joint shown in FIG. 1.

FIGS. 1 and 2 depict a first embodiment of a socket joint for carrying a mirror head or indirect vision system according to the present invention. The socket joint comprises a support tube 2, a joint base 4, an anchor 6, a fastener 8, wherein the fastener 8 simultaneously acts as a spring loaded connecting bolt 9 to connect a carrier structure 3 for a mirror head or indirect vision system to the joint base 4. The spring loaded connecting bolt 9 comprises a head 9a and a locking portion 9b. The carrier structure 3 is in the form of flat plate with a convex portion 3a in the middle. The joint base 4 comprises a back side 4a with a first concave portion 5a and a front side 4b with a second concave portion 5b. The anchor 6 is integrally formed to the first concave portion 5a on the back side 4a of joint base 4. The joint base 4 comprises a fastening hole 11 that extends form the front side 4b of the joint base 4 into and through the anchor 6 on the back side 4a of joint base 4 for receiving the fastener 8/fastening bolt 9. The first concave portion 5a on the back side 4a of the joint base 4 receives the complementary convex surface of the support tube 2 so that the joint base 4 fits flush against the support tube 2 being thus secured against twisting. The second concave portion 5b on front side 4b of the joint base 4 receives the complementary convex portion 3a of the carrier structure 3 for a mirror head or indirect vision system.

To mount the joint base 4 with anchor 6 onto the support tube 2, the support tube 2 is provided with an anchor opening 7 to receive the anchor 6. The anchor opening 7 is adapted in its shape to correspond to the shape of the anchor 6. The joint base 4 is pushed against the support tube 2 until the first concave portion 5a of the joint base 4 fits flush against the support tube 2 and the anchor 6 protrudes through the anchor opening 7 into the inside of the support tube 2. Subsequently, the convex portion 3a of the carrier structure 3 is pressed flush against the corresponding second concave portion 5b of the joint base 4. The carrier structure 3 comprises an opening 10 aligned with the fastening hole 11 in the joint base 4. The carrier structure 3 is fixed to the joint base 4 by use of a spring-loaded connecting bolt 9. This spring loaded connecting bolt 9 is inserted into the opening 10 in the carrier structure 3 and fastening hole 11 extending into the anchor 6.

In the first embodiment, the spring loaded connecting bolt 9 acts simultaneously as fastener bolt 8 for the anchor 6. Through the insertion of the locking portion 9b of the spring loaded connector bolt 9/fastener 8 into the anchor 6, the outer circumference of the anchor 6 is increased in a dowel-like fashion causing the anchor 6 to engage the inner surface of the support tube 2. Through this action, the support tube 2 is clamped between the anchor 6 and the joint base 4. To ensure the carrier structure 3 fits flush against the second concave portion 5b of the joint base 4, the spring loaded connecting bolt 9 comprises a helical spring 12 that is arranged along the longitudinal axis of and around the outer circumference of the connecting bolt 9/fastener 8. One end of the spring 12 contacts the carrier structure 3 via a spring receiving member 14, whereas the other end of the spring 12 contacts the head 9a of the connecting bolt 9, which has a larger radial circumference than the spring 12. By choosing an appropriate length for the connector bolt 9 the compression of the helical spring 12 and thus the clamping force between carrier structure 3 and second concave portion 5b is defined.

In the following description of further embodiments similar parts and components of the socket joint are designated with the same numerals.

Figure 3:
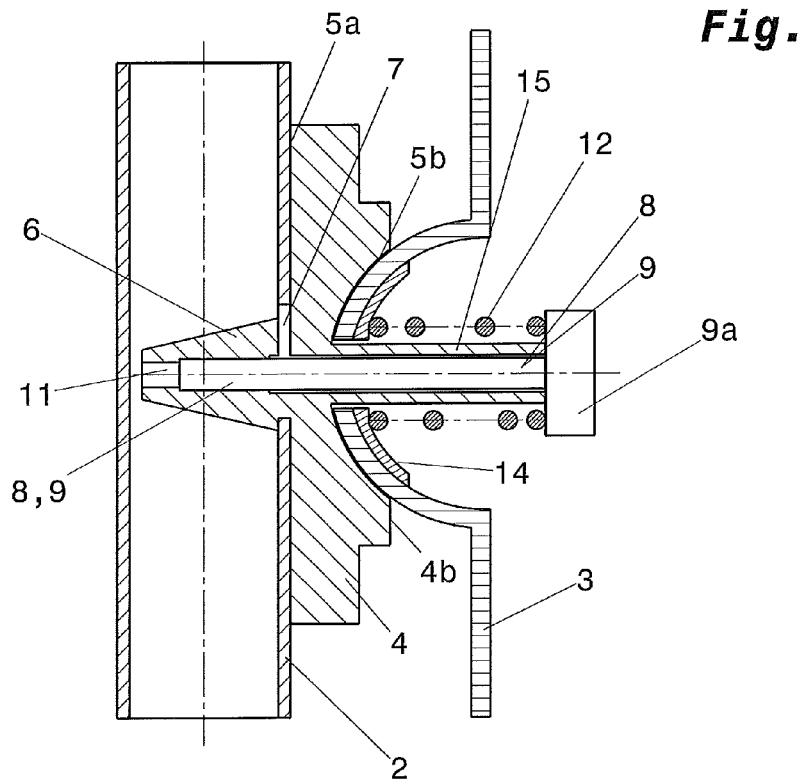
FIG. 3 shows a cross sectional view along the longitudinal axis of a support tube of second embodiment being a modification of the first embodiment according to FIGS. 1 and 2 with only one anchor that is essentially aligned with the central connecting bolt and wherein the joint base comprises a hollow shaft receiving a spring loaded connecting bolt.

FIG. 3 shows second embodiment socket joint being a modification of the socket joint depicted in FIGS. 1 and 2. In addition to the features of the socket joint described in FIGS. 1 and 2, the second embodiment of FIG. 3 comprises a hollow shaft 15 integrally formed with the joint base 4 on the second concave portion 5b to receive the connecting bolt 9/fastener 8. The connecting bolt 9/fastener 8, when inserted into the hollow shaft 15, fits flush against the interior surface of the hollow shaft 15. In the second embodiment, the helical spring 12 is arranged around the outer circumference of the hollow shaft 15. Since the head 9a of connecting bolt 9/fastener 8 abuts the free end of the hollow shaft 15 the length of the hollow shaft 15 defines the compressed length of the helical spring 12 and thus defines the compressing force of the helical spring 12.

Alternatively, the hollow shaft 15 can be omitted if a screw having a larger diameter adjacent to the screw head and a smaller diameter adjacent to its free end. Such a screw can be driven trough the fastening hole 11 until the screw part with the larger diameter makes contact with the joint base 4.

Figure 4:
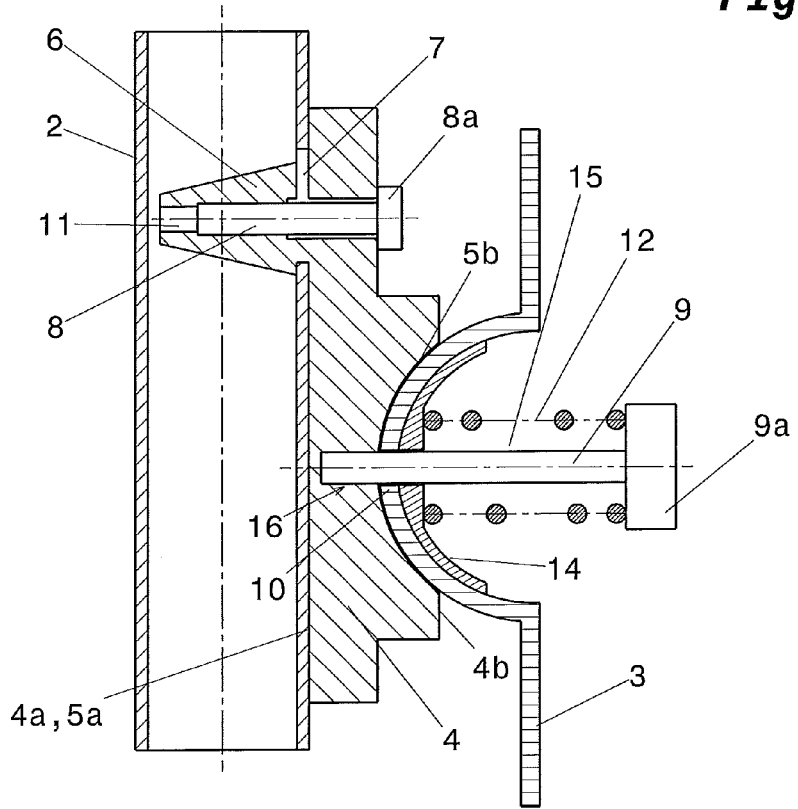
FIG. 4 shows a cross sectional view along the longitudinal axis of a support tube of a third embodiment of a socket joint with only one anchor that is located at a distance from the central connecting bolt along the longitudinal axis of the support tube.

FIG. 4 shows a third embodiment of the present invention, where in contrast to the first and second embodiment, the anchor 6 is not aligned with the spring loaded connecting bolt 9 but offset from the connecting bold 9 along the longitudinal axis of the support tube 2. Consequently, fastener 8 with fastener head 8a and a locking portion 8b and connecting bolt 9 are different components. Like with the previous embodiments the anchor 6 is integrally formed on the back side 4a of the joint base 4 and projects into the inside of the support tube 2 through an anchor opening 7 in the support tube 2. A fastening hole 11 extends form the front side 4b through the joint base 4 into the anchor 6. The fastener 8 is inserted into the fastening hole 11. The locking portion 8b of fastener 8 causes the dowel-like anchor 6 to expand radially thereby engaging the inner surface of the support tube 2 and clamping the support tube 2 between the anchor 6 and the joint base 4.

To receive the spring-loaded connecting bolt 9, the joint base 4 comprises a bore hole 16 extending from the second concave portion 5b into the joint base 4. The bore hole 16 is aligned with the opening 10 of the carrier structure 3, so that the carrier structure 3 can be fixed to the joint base 4 through the action of the spring-loaded connecting bolt 9. The connecting bolt 9 can thereby be a twist-lock bolt that is locked in the bore hole 16 e.g. by a form-locking mechanism. Alternatively, the connecting bolt 9 can be glued into the bore hole 16 or fixed in the bore hole 16 via a clip mechanism.

Figure 5:
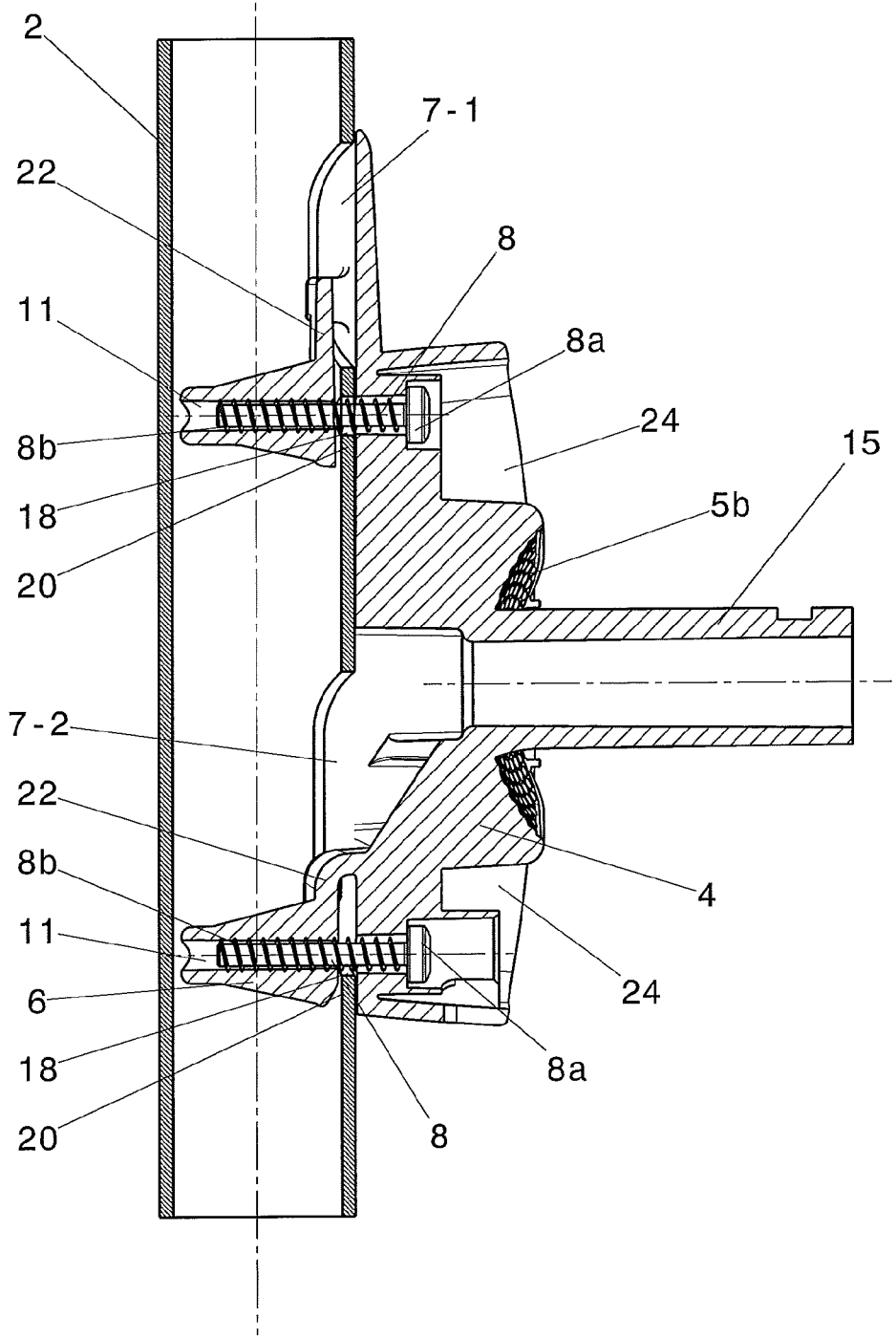
FIG. 5 shows a cross sectional view along the longitudinal axis of the support tube of a fourth embodiment socket joint with a hollow shaft and two anchors that are located each at a equal distance from the central connecting bolt in opposite directions along the longitudinal axis of the support tube.
Figure 6:
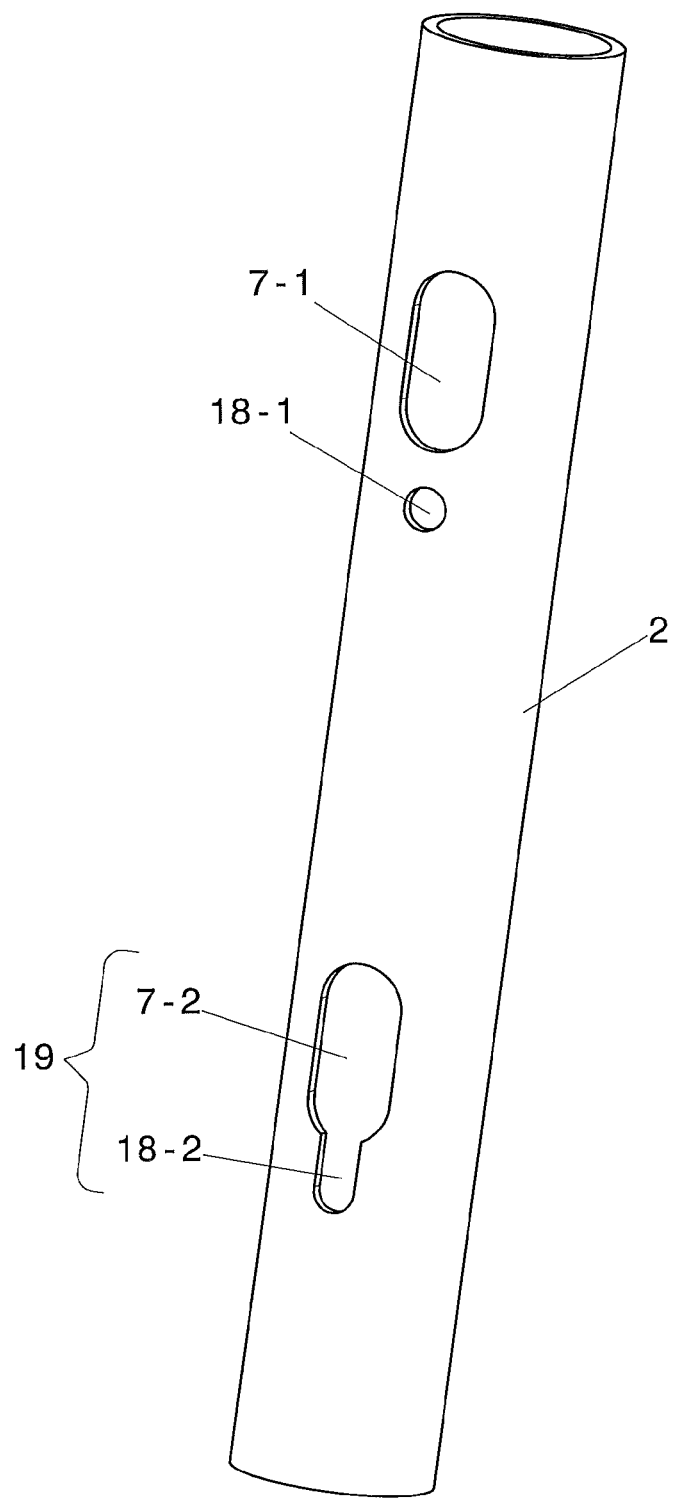
FIG. 6 shows a perspective view of the support tube of the fourth embodiment of FIG. 5.

FIGS. 5 and 6 depict a fourth socket joint embodiment which differs from the fourth embodiment in that two anchors 6-1, 6-2 are provided. The two anchors 6-1, 6-2 are spaced apart a defined distance along the longitudinal axis of the support tube 2 with the hollow shaft 15 in between. A spring loaded connecting bolt 9 with a helical spring 12—not shown in FIG. 5—can be arranged with the hollow shaft 15 similar to second embodiment shown in FIG. 3. To allow an insertion of the anchors 6-1, 6-2 into the support tube 2, the support tube 2 comprises two axially spaced apart anchor openings 7-1 and 7-2 see FIG. 6. In addition adjacent to each anchor opening 7-1, 7-2 fixing openings 18-1 and 18-2 are provided in the support tube 2. To mount the socket joint 4 onto the support tube 2, the two spaced apart anchors 6-1, 6-2 are inserted each into correspondingly spaced apart anchor openings 7-1, 7-2 in the support tube 2. The two anchors 6-1, 6-2 each comprise a lateral mounting slits 20 partly separating the anchors 6-1, 6-2 from the joint base 4. The connection between anchors 6-1, 6-2 and the joint base 4 is maintained via securing portions 22. The lateral mounting slits 20 allow displacement of the joint base 4 with anchors 6-1, 6-2 along the longitudinal axis of the support tube 2 until the fastening hole 11 is aligned each with one of the fixing openings 18-1, 18-2. The mounting slits 20 receive part of the wall of the support tube 2 during the axial displacement of the anchor 6.

To fix the joint base 4 to the support tube 2, a fastener bolt or screw 8 is inserted into fastening holes 11 and fixing openings 18-1, 18-2 thereby causing the anchor 6 to engage with the interior surface of the support tube 2.

The anchor opening 7 and the fixing opening 18 can be provided as two distinct openings adjacent to each, anchor opening 7-1 and fixing opening 18-1, or a single opening 19 can be provided fulfilling both functions; anchor opening 7-2 and fixing opening 18-2 with the anchor opening 7-2 being wider than the fixing opening 18-2. In both cases, the anchor opening 7 and the fixing opening 18 are configured to allow alignment of the fastening hole 11 with the fixing opening 18 and insertion of the fastener 8.

On the front side 4b of he joint base 4 are provided with recesses 24 above and around the fastening holes 11. The head 8a of each fastener 8 lies within recess 24 and is thereby buried within the joint base 4. In the fourth embodiment, the fasteners 8 are screws.

Figure 7:
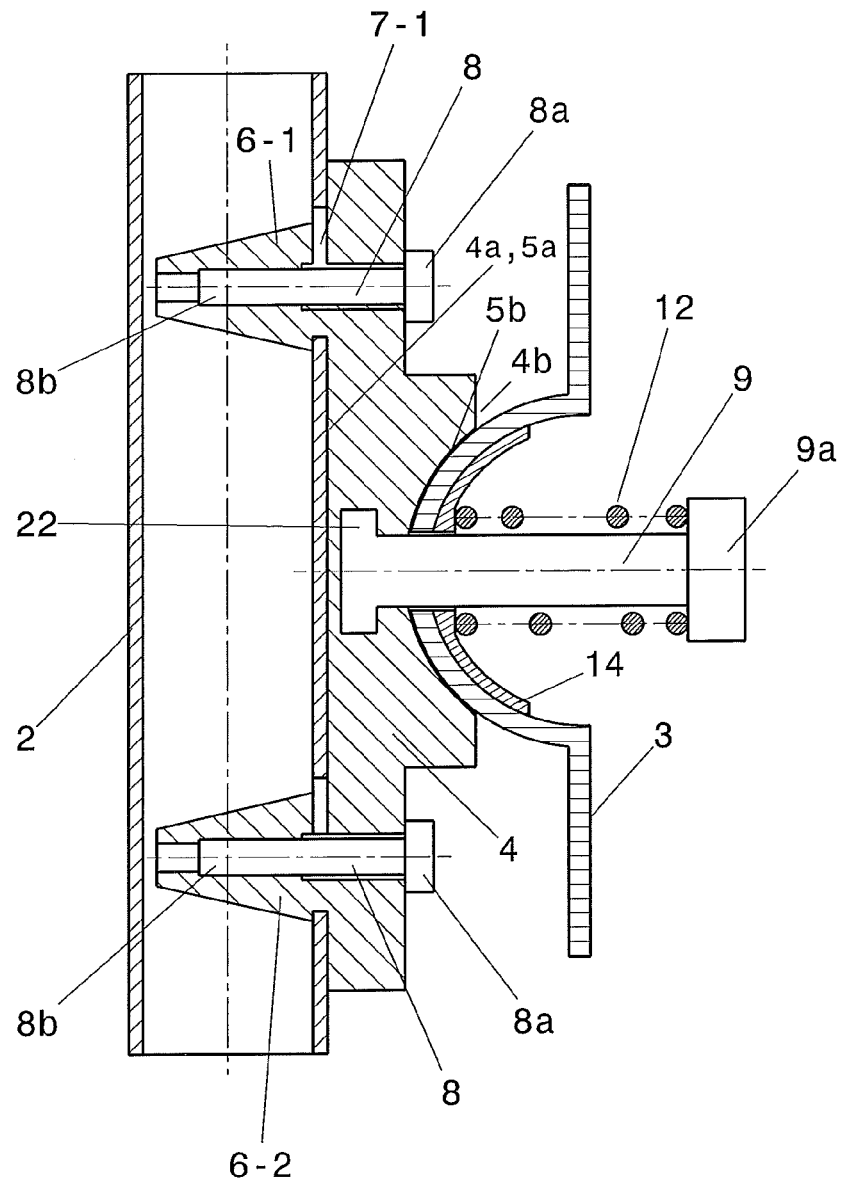
FIG. 7 shows a fifth embodiment socket joint being a modification of the fourth embodiment shown in FIG. 6 comprising a spring loaded connector bolt but no hollow shaft.

FIG. 7 shows fifth socket joint embodiment being a modification of the fourth embodiment shown in FIG. 6. The fifth embodiment differs from the fourth embodiment in that joint base 4 does not comprise a hollow shaft 15 like in the first and third embodiment. The spring loaded bolt 9 comprises locking portion 9b that is buried in the joint base 4 similar to the connecting bolt 9 in FIG. 4. The free end of connecting bolt 9 with head 9a extends out of the second concave portion 5b of joint base 4.

Figure 8:
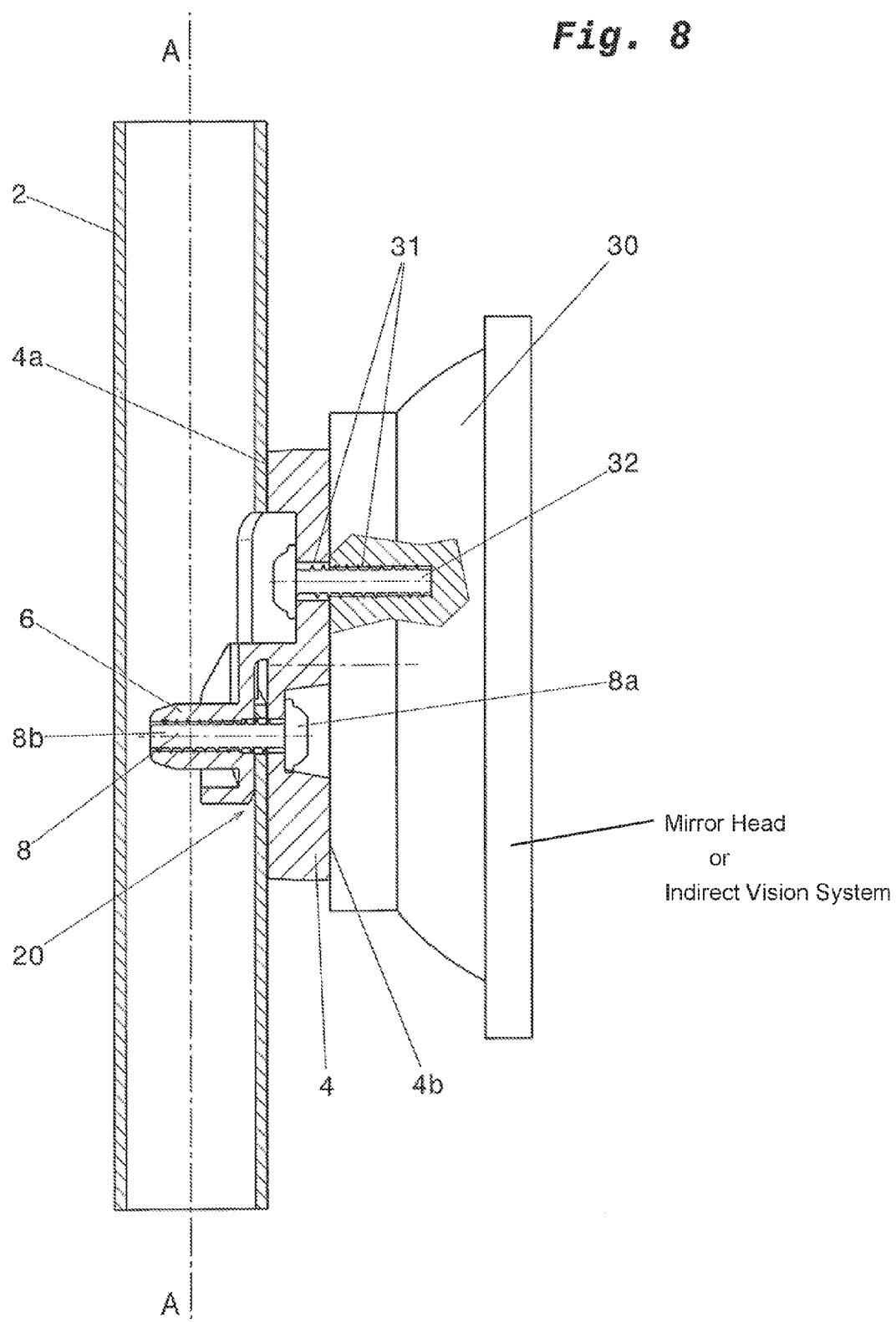
FIG. 8 shows a sixth embodiment socket joint being a modification of the third embodiment shown in FIG. 4, wherein the joint base carries an adjusting unit.
Figure 9:
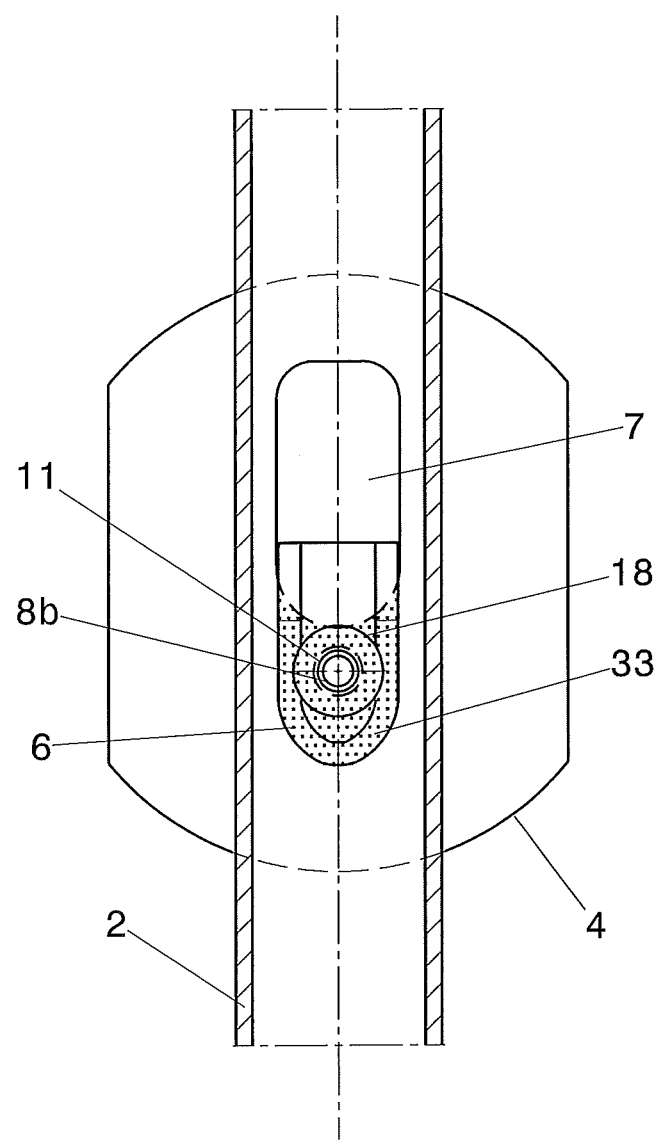
FIG. 9 shows a cross sectional view along line A-A in FIG. 8 viewed in the direction indicated by the arrow V in FIG. 8.

FIGS. 8 and 9 show a sixth socket joint embodiment being a modification of the third embodiment shown in FIG. 4. The sixth embodiment differs from the third in that the joint base 4 carries a conventional adjusting unit 30 that is affixed to the joint base 4 by a fastener 8. In this embodiment, the fastener 8 connecting the joint base 4 to the support tube 2 is a screw 8 with a screw head 8a that extends through fastening hole 11 in the joint base 4 into anchor 6.

Further, a mounting hole 31 extends from the back side 4a of joint base 4 through the joint base 4 and into the adjusting unit 30. With a mounting screw 32 inserted into the mounting hole 31 the adjusting unit 30 is fixed to the joint base 4. In the sixth embodiment mounting screw 32 is inserted into mounting hole 31 from the back side 4a of joint base 4. Alternatively, the mounting screw 32 may be inserted from the front side of adjusting unit 30.

The cross sectional view of FIG. 9 depicts the embodiment of FIG. 8 as viewed in the direction indicated by the arrow V in FIG. 8. Through the anchor opening 7 in the support tube 2 the screw head 8a of the screw 8 (i.e. the fastener 8) fixing the joint base 4 with attached adjusting unit 30 can be seen. The anchor 6 connecting the joint base 4 to the support tube 2 projects through the anchor opening 7 into the support tube 2. Like in the fourth embodiment the anchors 6 comprises a lateral slit 20 to allow alignment of the fastening hole 11 with fixing opening 18. The locking portion 8b of the fastener screw 8 projects through the fastening hole 11 of the anchor 6. The dotted area 33 indicates the contact area between the anchor 6 and the inside of support tube 2.

REFERENCE NUMERALS 2 support tube
3 carrier structure
3a convex portion of 3
4 joint base
4a backside of 4
4b front side of 4
5a first concave portion
5b second concave portion
6 anchor
7 anchor opening
8 fastener
8a head of 8
8b locking portion of 8
9 connecting bolt
9a head of 9
9b locking portion of 9
10 opening in 3
11 fastening hole
12 helical spring
14 spring receiving member
15 hollow shaft
16 bore hole
18 fixing opening
19 opening (7-2, 18-2)
20 mounting slit
22 securing portion
24 recess in 4
30 adjusting unit
31 mounting hole
32 mounting screw
33 contact area

What is claimed is:

1. Socket joint for carrying a mirror head or an indirect vision system, said socket joint comprising:
    a support tube to be attached to a vehicle and comprising at least one anchor opening;
    a joint base with a back side and a front side, wherein said back side contacts the outside of said support tube;
    at least one anchor extending from the back side of the joint base through said at least one anchor opening in said support tube into said support tube, wherein said at least one anchor engages an interior surface of said support tube;
    at least one fastener extending through a fastening hole from the front side of the joint base into said at least one anchor to clamp said support tube between said at least one anchor and the back side of the joint base; and
    a carrier structure on the front side of the joint base for carrying a mirror head or an indirect vision system,
    wherein a fixing opening is provided adjacent to each anchor opening and wherein each anchor comprises a mounting slit allowing alignment of the fixing opening with the fastening hole by axial movement of the joint base with the anchor after insertion of the anchor into the anchor opening.

2. Socket joint according to claim 1, wherein said fixing opening and said anchor opening constitute a single opening with different width.

3. Socket joint according to claim 1, wherein the back side of said joint base comprises a first concave portion receiving said support tube.

4. Socket joint according to claim 1,
    wherein said carrier structure comprises a convex portion,
    wherein a second concave portion is provided on the front side of said joint base to receive said convex portion of said carrier structure, and
    wherein said carrier structure is pressed to said second concave portion by connecting means and is pivotally movable for angular adjustment of the mirror head or the indirect vision system.

5. Socket joint according to claim 4, wherein the connecting means comprises a central connecting shaft that extends outward from said second concave portion on said joint base.

6. Socket joint according to claim 4, wherein the connecting means comprises spring loaded connecting bolt for pressing said carrier structure to said joint base.

7. Socket joint according to claim 6, wherein the at least one anchor is essentially aligned with the spring loaded connecting bolt and wherein the spring loaded connecting bolt simultaneously is the at least one fastener extending through said fastening hole from the front side of the joint base into said at least one anchor to form a doweled joint.

8. Socket joint according to claim 1,
    wherein said carrier structure is an adjusting unit mounted to said joint base by connecting means.

9. Socket joint according to claim 8, wherein the connecting means is a screw connection.

10. Socket joint according to claim 1, wherein the at least one anchor is a plurality of axially spaced apart anchors and the at least one fastener is a plurality of fasteners.

11. Socket joint according to claim 10, wherein the plurality of anchors are arranged in a straight line.

12. Socket joint according to claim 1, wherein each fastener engages said anchor in a form-locking or friction-locking mechanism.

13. Socket joint for carrying a mirror head or an indirect vision system, said socket joint comprising:
    a support tube to be attached to a vehicle and comprising at least one anchor opening;
    a joint base with a back side and a front side, wherein said back side contacts the outside of said support tube;
    at least one anchor extending from the back side of the joint base through said at least one anchor opening in said support tube into said support tube, wherein said at least one anchor engages an interior surface of said support tube;
    at least one fastener extending through a fastening hole from the front side of the joint base into said at least one anchor to clamp said support tube between said at least one anchor and the back side of the joint base; and
    a carrier structure on the front side of the joint base for carrying a mirror head or an indirect vision system,
    wherein said carrier structure comprises a convex portion, and wherein a concave portion is provided on the from side of said joint base to receive said convex portion of said carrier structure, said convex portion being complementary to said concave portion, and
    wherein said carrier structure is pressed to said concave portion by connecting means and is pivotally movable.

14. Socket joint according to claim 13, wherein the connecting means comprises a central connecting shaft that extends outward from said concave portion on said joint base.

15. Socket joint according to claim 13, wherein the connecting means comprises spring loaded connecting bolt for pressing said carrier structure to said joint base.

16. Socket joint for carrying a mirror head or an indirect vision system, said socket joint comprising:
- a support tube to be attached to a vehicle and comprising at least one anchor opening;
- a joint base with a back side and a front side, wherein said back side contacts the outside of said support tube;
- at least one anchor extending from the back side of the joint base through said at least one anchor opening in said support tube into said support tube, said at least one anchor having a conical shape, wherein said at least one anchor engages an interior surface of said support tube;
- at least one fastener extending through a fastening hole from the front side of the joint base into said at least one anchor to clamp said support tube between said at least one anchor and the back side of the joint base; and
- a carrier structure on the front side of the joint base for carrying a mirror head or an indirect vision system.

17. Socket joint according to claim 16, wherein a fixing opening is provided adjacent to each anchor opening and wherein each anchor comprises a mounting slit allowing alignment of the fixing opening with the fastening hole by axial movement of the joint base with the at least one anchor after insertion of the at least one anchor into the at least one anchor opening.

* * * * *